F. R. WALTER.
HARNESS BIT.
APPLICATION FILED SEPT. 9, 1913.
1,129,255. Patented Feb. 23, 1915.
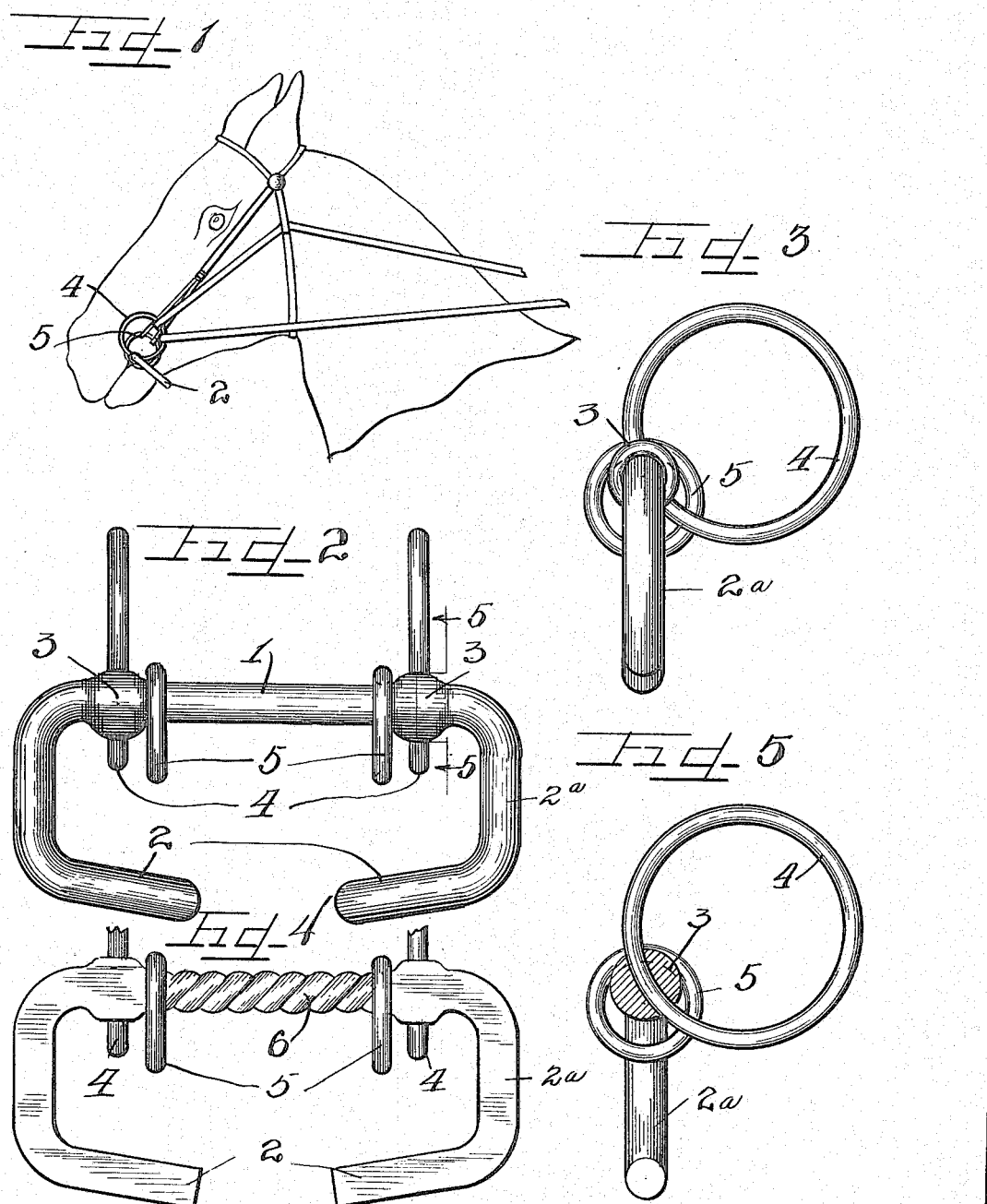

UNITED STATES PATENT OFFICE.

FRED R. WALTER, OF GENESEO, ILLINOIS.

HARNESS-BIT.

1,129,255.   Specification of Letters Patent.   Patented Feb. 23, 1915.

Application filed September 9, 1913. Serial No. 788,943.

*To all whom it may concern:*

Be it known that I, FRED R. WALTER, a citizen of the United States, and a resident of the city of Geneseo, county of Henry, and State of Illinois, have invented certain new and useful Improvements in Harness-Bits; and I do hereby declare that the following is a full, clear, and exact description of the same, reference being had to the accompanying drawings, and to the numerals of reference marked thereon, which form a part of this specification.

This invention relates to means for bringing an unmanageable horse or other driven animal under immediate control. It is a well known fact that a fractious horse is restrained from kicking or running away if his head be held high. It is common for runaway horses to lower their heads, and by taking the bit in their teeth they become unmanageable.

It is an object of this invention to provide a device wherein the slightest pull applied thereto will constrain the horse to raise his head.

It is also an object of this invention to provide a device adapted, when a pull is exerted thereon by the reins, to close the mouth of the animal to prevent the animal seizing the device in his teeth.

It is also an object of this invention to provide a device adapted to close the mouth of the animal and cause natural elevation of the head.

It is also an object of this invention to provide a bit wherein a pull is automatically applied thereto with a lowering of the horse's head, thus preventing the horse from becoming unmanageable.

It is also an object of this invention to provide a bit for guiding a horse, but one in which when excessive pull is applied thereto, will apply a force to the lower jaw of the animal, causing the animal to raise his head, thereby preventing the animal getting beyond control of the driver.

It is furthermore an object of this invention to provide a bit such that pressure may be applied to the horse's jaw by a pull upon the bit to restrain the horse when unmanageable.

It is finally an object of this invention to provide a cheap, simple, and durable device composed of only a few parts, and easily put in place in the animal's mouth.

The invention (in a preferred form) is illustrated in the drawings, and hereinafter more fully described.

In the drawings: Figure 1 is an illustration of a horse's head with a device in normal position and connected to the bridle. Fig. 2 is a front elevation of the device. Fig. 3 is an end elevation thereof. Fig. 4 is a rear elevation of a bit of modified construction. Fig. 5 is a section taken on line 5—5 of Fig. 2.

As shown in the drawings the device comprises a bit-bar or mouth piece 1 having its ends down-turned at 2$^a$, which are in turn bent to extend toward each other, as shown at 2, all of the parts 1, 2$^a$, and 2 being in substantially the same plane. The bit-bar 1 is enlarged at the points 3, and provided with apertures therethrough in which are freely inserted the rings 4. Rings 5, are loosely engaged upon the shank preferably between the rings 4, to prevent said rings 5, from slipping over the ends of the bit and thereby being lost. As shown in Fig. 4, the modification is constructed from rectangular stock and is twisted to afford a series of corrugations 6, along the shank of the bit.

The operation is as follows: The large rings 4, are provided for attachment to the driving and check reins of the harness, whereas the smaller rings 5, are for attachment to the bridle to hold the bit and bridle in proper relation when placed upon the head of the horse. The extended hooks 2, at the ends of the bit serve a double purpose, namely that of preventing sliding of the bit through the horse's mouth, which is also prevented to some extent by the rings 4, but more particularly to project beneath the lower jaw of the animal so that when a pull is applied upon either or both of the rings 4, the hooks 2, will be projected forwardly and upwardly, thereby pressing beneath the lower jaw of the animal, constraining the animal to naturally elevate his head, and thus prevent refractory actions of the horse. The pressure of the hook members 2, beneath the lower jaw also serves to close the mouth of the animal, thereby preventing seizure of the bit between the teeth.

For animals having an extremely tough mouth wherein the ordinary type of bit has little or no effect, I provide my device with a series of varied size corrugations on the shank of the bit. The corrugations bite into the flesh and rapidly bring the extremely obstinate animal under submission.

I am aware that details of construction may be varied through a wide range without departing from the principles of this invention. I therefore do not purpose limiting the patent granted otherwise than necessitated by the prior art.

I claim as my invention:

1. In a device of the class described, a bit-bar bent downwardly and then inwardly at each end and in the same plane with said bit-bar, said inwardly bent portions adapted to engage beneath the lower jaw of the animal, and means connected with said bit-bar for rotating the same to press said inwardly bent members against the lower jaw of the animal.

2. In a device of the class described, a bit-bar bent downwardly and then inwardly at each end and in the same plane with said bit-bar to engage beneath the lower jaw of the animal, and rings engaged in said bit adapted for connection to the reins of the harness to receive a pull therefrom to rotate the bit.

3. In a device of the class described, a bit-bar bent downwardly and then inwardly at each end and in the same plane with said bit-bar to engage beneath the lower jaw of the animal, and rings journaled in said bit-bar and adapted for connection with the reins of the harness to receive a pull therefrom to rotate said bit-bar.

In testimony whereof I have hereunto subscribed my name in the presence of two subscribing witnesses.

FRED R. WALTER.

Witnesses:
RUBIE E. BEALE,
HENRY WATERMAN.

Copies of this patent may be obtained for five cents each, by addressing the "Commissioner of Patents, Washington, D. C."